Patented Oct. 12, 1954

2,691,591

UNITED STATES PATENT OFFICE 2,691,591

SUGARLESS BEVERAGE

George M. Brenner, Colfax, Iowa

No Drawing. Application January 4, 1951,
Serial No. 204,485

8 Claims. (Cl. 99—28)

This invention relates to beverages and ingredients therefor, and more particularly to a sugarless beverage containing a minor proportion of relatively insoluble solids, and a relatively stable, synthetic sweetening agent which has substantially no caloric value.

My invention may be applicable in the formulation of a sugarless beverage containing a minor proportion of a synthetic sweetening agent, sodium cyclohexylsulfamate, for use by individuals restricted to a substantially sugar-free diet.

In addition, the basic psychometric parameters must attain standards of acceptability. These acceptable parameters may be identified as relative sweetness corresponding to an equivalent type and degree furnished generally by the sugars, such as sucrose, dextrose and the like, viscosity, syrupiness and taste.

I have discovered that in the preparation of a substantially non-caloric beverage, the beverage must have a suitable syrupiness, body and viscosity in addition to sweetness. Therefore, I have added a relatively inert insoluble cellulosic substance, such as methyl cellulose. This cellulosic substance affords an increased dispersibility of other additives which may be used in order to increase the body or the syrupiness of the beverage, and in of itself forms a somewhat similar function.

In addition, one of the aforesaid additives which may be used is citrus pectin. By utilizing the combination of the cellulose substance and a citrus pectin additive, the desired physical composition of the beverage may be obtained. It is important that in the preparation of a sugarless beverage that the psychological want of the individual be fulfilled.

When utilizing the addition of a cellulosic substance and/or a pectin additive, I have found that the beverage composition breaks into excessive foaming and it is highly desirable to use an anti-foaming agent. This excess foaming is undesirable because it tends to reduce the percentage of carbonation which may be used, and in addition excessive foaming is undesirable in the palatability of such a beverage. I have found that excessive foaming may be substantially reduced by addition of a minor proportion of a polyorgano siloxane. More specifically, the polyorgano siloxane may be defined as an alkyl silicone, such as methyl silicone or ethyl silicone. These silicone oil, foam suppressing agents are readily adaptable and perform the desired function in combination with the other ingredients of the beverage composition. The silicone oil, foam suppressing agent may be used in the beverage over a range of approximately 0.005% to 0.04% by weight; a preferred amount of the foam suppressing agent being approximately 0.009% by weight.

By the use of sodium cyclohexylsulfamate as a stable synthetic sweetening agent, a beverage composition with substantially no food value may be obtained for use in diabetic, reducing and other diets, in which sugar is forbidden or the amount limited. The use of sodium cyclohexylsulfamate as a sweetening agent has an equivalent sweetening power wherein approximately one-eighth of a gram of sodium cyclohexylsulfamate is approximately equivalent to one teaspoon of sugar (sucrose).

In addition, sodium cyclohexylsulfamate has substantially no bitter after-taste when used in a composition, wherein the quantity of the sweetening agent is approximately less than 0.8% by weight. Sodium cyclohexylsulfamate may be used over a range of approximately 0.1% to 0.8% by weight, the preferred amount being about 0.25% by weight.

Furthermore, sodium cyclohexylsulfamate is substantially chemically stable when used in a beverage and does not decompose by use of heat necessary in the preparation or pasteurization of the beverage medium. It is further pointed out that when the beverage medium is subjected to carbonation, sodium cyclohexylsulfamate is relatively stable under storing and bottling conditions.

The pectin additive may be defined as a group of compounds formed from the protopectin of unripe citrus fruits, and which on hydrolysis forms pectic acid. Many common processes are available and the composition and formulation of the citrus pectin constitutes no part of the present invention.

The citrus pectin additive in the beverage may be used over a range of approximately 0.006% to 0.06% by weight; a preferred amount being approximately 0.009% by weight. The inert cellulosic substance may be used over a range of approximately 0.05% to 0.12% by weight, and when used in combination with the pectin additive we have found that 0.08% is preferred.

Various artificial flavors and coloring may be added in order to give the beverage color and taste of a carbonated or non-carbonated beverage.

An example of the formulation of the beverage is as follows:

| Ingredients: | Weight in grams |
|---|---|
| Sodium cyclohexylsulfamate | 0.13 |
| Methyl cellulose | 0.07 |
| Pectin | 0.08 |
| Silicone | 0.008 |
| Water | 210 |

Minor proportions of flavor and coloring ingredients.

Having thus described my invention, what I have claimed and desire to protect by Letters Patent is:

I claim as my invention:

1. A beverage composition comprising an aqueous solution of sodium cyclohexylsulfamate in an amount less than 0.8% by weight, said composition containing a soluble cellulose derivative, a citrus pectin additive and an alkyl silicone foam suppressing agent, having a combined weight proportion of about 0.2% by weight of the total weight of the beverage composition.

2. A beverage composition comprising an aqueous solution of sodium cyclohexylsulfamate in an amount less than 0.8% by weight, said composition containing a soluble cellulose derivative in an amount of about 0.08% by weight, a citrus pectin additive and an alkyl silicone foam suppressing agent.

3. A beverage composition comprising an aqueous solution of sodium cyclohexylsulfamate in an amount less than 0.8% by weight, said composition containing a soluble cellulose derivative, a citrus pectin additive in an amount of about 0.09% by weight, and an alkyl silicone foam suppressing agent.

4. A beverage composition comprising an aqueous solution of sodium cyclohexylsulfamate in an amount less than 0.8% by weight, said composition containing a soluble cellulose derivative, a citrus pectin additive and an alkyl silicone foam suppressing agent in an amount of about 0.09%.

5. A dietetic soft drink comprising an aqueous solution of sodium cyclohexylsulfamate, citrus pectin, a soluble cellulose derivative, and an alkyl silicone foam suppressing agent.

6. A dietetic soft drink comprising an aqueous solution of sodium cyclohexylsulfamate, citrus pectin and a soluble cellulose derivative.

7. A dietetic soft drink consisting of an aqueous solution of sodium cyclohexylsulfamate, citrus pectin, and non-sweetening artificial flavoring and coloring ingredients.

8. A sweetening and bodying additive for use in preparing a dietetic soft drink which includes an artificially flavored and colored aqueous solution said additive consisting of an aqueous solution of sodium cyclohexylsulfamate and a soluble cellulose derivative.

References Cited in the file of this patent

UNITED STATES PATENTS

| Number | Name | Date |
|---|---|---|
| 1,925,441 | Finley | Sept. 5, 1933 |
| 2,275,125 | Audrieth et al. | Mar. 3, 1942 |
| 2,383,617 | Robinson | Aug. 28, 1945 |
| 2,555,465 | Bogin et al. | June 5, 1951 |
| 2,563,588 | Dixon | Aug. 7, 1951 |
| 2,629,665 | Gordon | Feb. 24, 1953 |

OTHER REFERENCES

Jour. Amer. Med. Assoc., vol. 143: No. 7, A13, June 17, 1950 (Advertisement).